United States Patent [19]

Goebel

[11] Patent Number: 4,539,274

[45] Date of Patent: * Sep. 3, 1985

[54] ELECTROCHEMICAL CELL HAVING WOUND ELECTRODE STRUCTURES

[75] Inventor: Franz Goebel, Sudbury, Mass.

[73] Assignee: GTE Government Systems Corporation, Stamford, Conn.

[*] Notice: The portion of the term of this patent subsequent to Sep. 3, 2002 has been disclaimed.

[21] Appl. No.: 559,061

[22] Filed: Dec. 7, 1983

[51] Int. Cl.³ ............................................. H01M 6/10
[52] U.S. Cl. ..................................... 429/94; 429/101; 429/194; 429/211
[58] Field of Search ................ 429/94, 156, 157, 158, 429/159, 161, 194, 196, 101, 211

[56] References Cited

U.S. PATENT DOCUMENTS

| | | | |
|---|---|---|---|
| 3,373,060 | 3/1968 | Gray | 429/94 |
| 3,490,949 | 1/1970 | Deshamps | 429/94 |
| 3,510,353 | 5/1970 | McHenry | 429/94 |
| 3,565,690 | 2/1971 | du Plessix et al. | 429/94 |
| 3,761,314 | 9/1973 | Cailley | 429/94 |
| 3,775,182 | 11/1973 | Patton et al. | 429/94 |
| 4,020,248 | 4/1977 | Goebel | 429/164 |
| 4,450,213 | 5/1984 | Dey et al. | 429/194 |

Primary Examiner—Anthony Skapars
Attorney, Agent, or Firm—David M. Keay

[57] ABSTRACT

Electrochemical cell having a battery stack of an electrode assembly wound on a spool. The electrode assembly includes two elongated electrode structures, an anode electrode structure and a cathode current collector structure. The spool has a central post of insulating material and two conductive flanges. The two electrode structures are wound around the post with insulating material between them, the anode electrode structure making contact with one of the flanges and the cathode current collector structure making contact with the other flange.

13 Claims, 2 Drawing Figures

4,539,274

ELECTROCHEMICAL CELL HAVING WOUND ELECTRODE STRUCTURES

CROSS-REFERENCE TO RELATED APPLICATIONS

Application Ser. No. 559,060 filed concurrently herewith by Franz Goebel entitled "Electrode Structure for Electrochemical Cell" and application Ser. No. 559,059 filed concurrently herewith by Franz Goebel entitled "Electrochemical Cell Having a Plurality of Battery Stacks" describe and claim subject matter related to the present application.

BACKGROUND OF THE INVENTION

This invention relates to electrochemical cells. More particularly, it is concerned with electrochemical cells having wound electrode structures.

A particularly effective class of primary electrochemical cells which employs soluble or liquid cathode materials, as opposed to more conventional solid cathodes, has undergone rapid development in recent years. In these cells the active cathode material is usually a fluid solvent for an electrolyte solute which provides conductivity. The active anode of the cell is usually lithium or other highly electropositive metal. During discharge the solvent is electrochemically reduced on a cathode current collector.

In electrochemical cells of the foregoing type of cylindrical configuration one form of electrode structure which has become widely used is the so-called "jelly-roll" type of electrode assembly which is described in U.S. Pat. Nos. 3,510,353 to McHenry and 4,020,248 to Goebel. With this type of electrode construction the anode electrode and the cathode current collector electrode are elongated structures which are wound in a coil to provide alternating anode and cathode current collector electrodes separated by intervening insulating material. The cylindrical battery stack thus formed is placed in a cylindrical case of a housing with appropriate electrical connections provided between the electrodes and external terminals.

Cells with the foregoing "jelly-roll" battery stack arrangement may exhibit certain problems, particularly when operated under high discharge conditions. The paths of current flow from different portions of each of the electrodes to the external terminals vary; and, therefore, internal temperatures and internal resistances are not uniform throughout the battery stack. There are also difficulties in winding the assembly of electrodes and in assembling the battery stack with the cylindrical case of the cell housing.

SUMMARY OF THE INVENTION

An improved electrochemical cell in accordance with the present invention having a wound electrode structure comprises a housing and a battery stack within the housing. The battery stack includes a first contact member of conductive material having a contact surface and a second contact member of conductive material having a contact surface. A post extends between the first and second contact members supporting them in fixed relationship with respect to each other and with the two contact members electrically insulated from each other. The battery stack also includes first and second electrode structures which are wound about the post and are electrically insulated from each other. The first electrode structure is in physical and electrical contact with the contact surface of the first contact member and is electrically insulated from the second contact member. The second electrode structure is in physical and electrical contact with the contact surface of the second contact member and is electrically insulated from the first contact member. The cell also includes an electrolyte within the housing in contact with the first and second electrode structures. First and second terminal means are connected to the first and second contact members, respectively.

For a better understanding of the present invention, together with other and further objects, advantages, and capabilities thereof, reference is made to the following discussion and appended claims in connection with the above-described drawings.

DETAILED DESCRIPTION OF THE INVENTION

Figure 1:
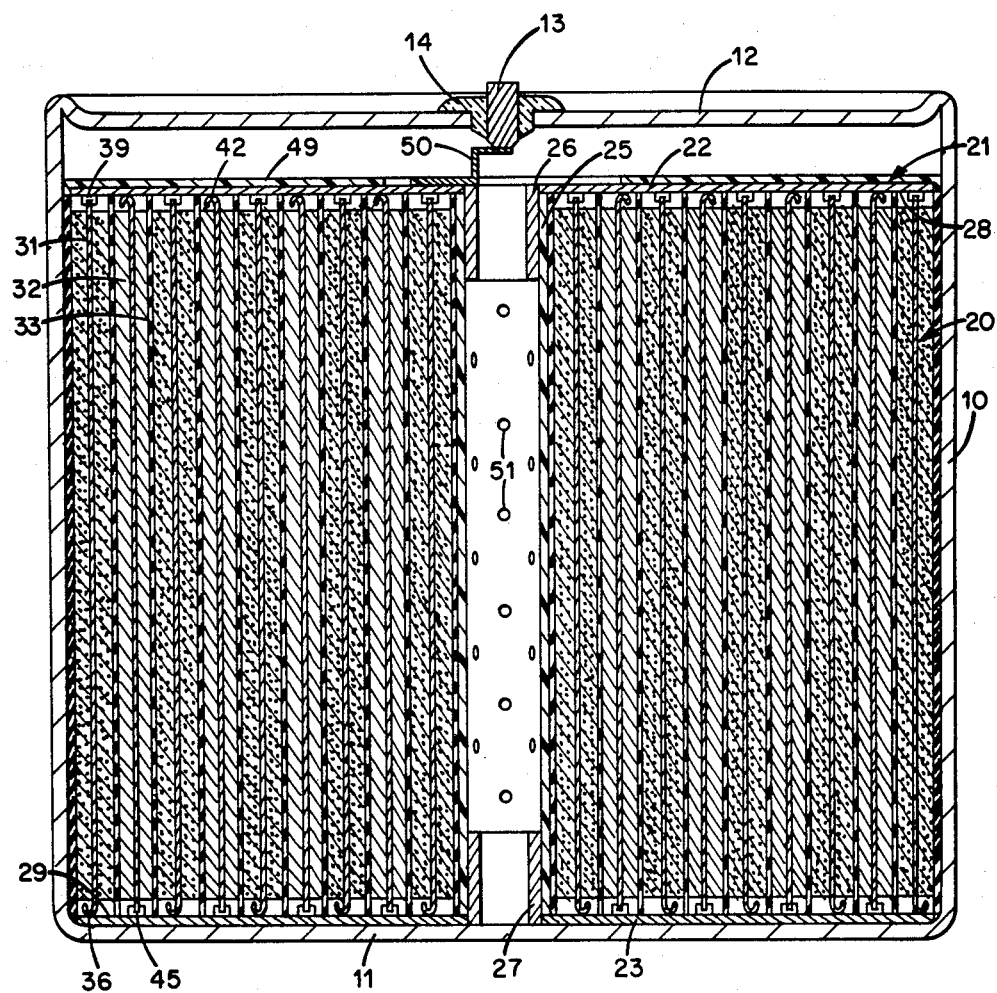
FIG. 1 is an elevational view partially in cross-section illustrating an electrochemical cell in accordance with the present invention.

FIG. 1 illustrates an electrochemical cell in accordance with the present invention. The cell includes a housing of a hollow, cylindrical, metal case 10 closed at one end with a bottom wall 11. The other end of the case 10 is closed by a metal cover 12 sealed to the case. A metal terminal 13 is sealed through a hermetic insulating seal member 14 centrally of the cover.

Figure 2:
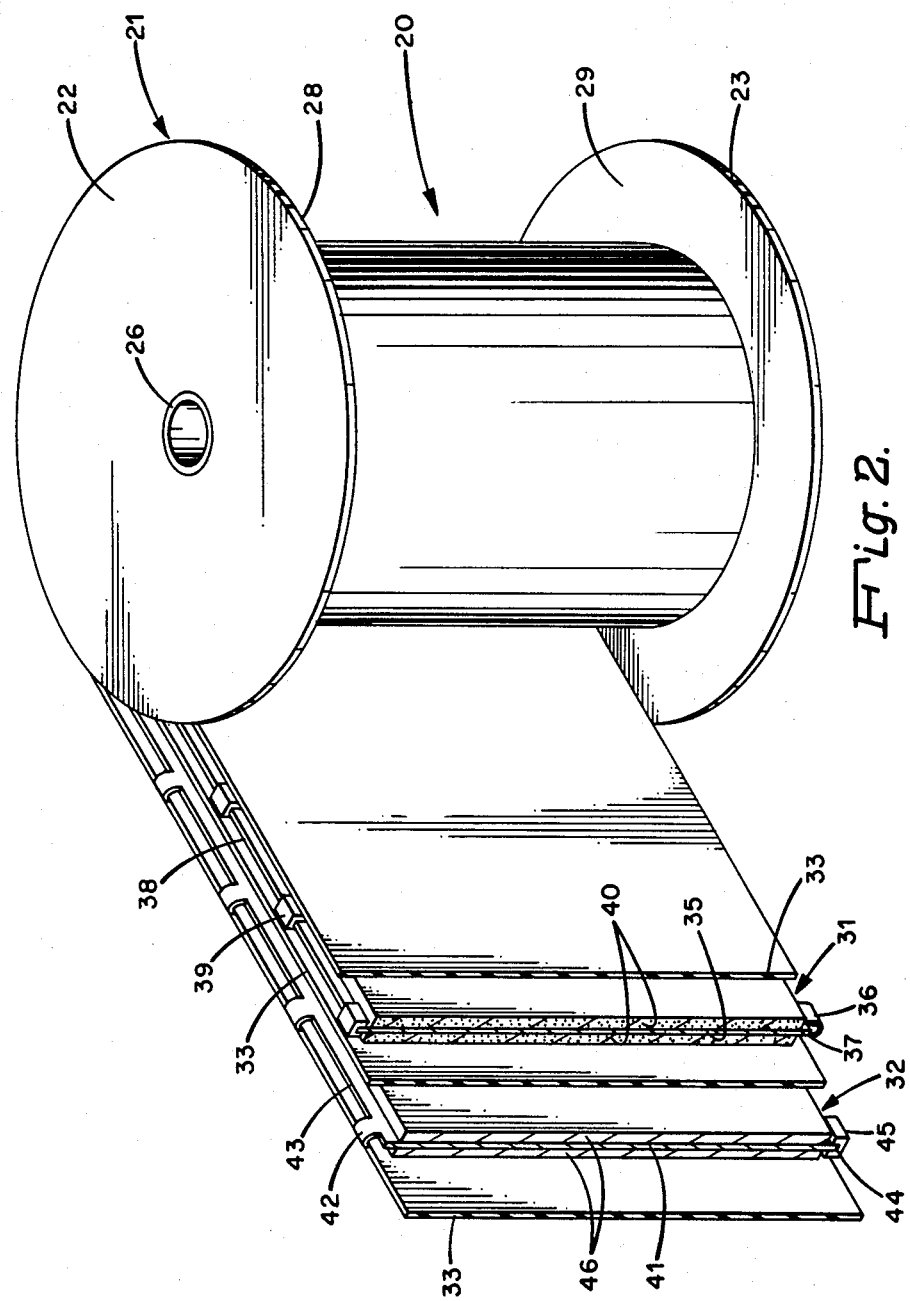
FIG. 2 is a perspective view illustrating the battery stack of the electrochemical cell of FIG. 1 with portions broken away showing the electrode structures partially wound on a post.

The housing contains an electrochemical system which includes a battery stack 20 shown in FIG. 2. In accordance with the present invention, the battery stack includes an assembly of electrodes wound on a spool or reel 21. The spool 21 has an upper flange 22 and a lower flange 23 of metal. A central post or shaft 25 of a suitable insulating material such as a fluorocarbon material which is inert to the ingredients of the electrochemical system supports the flanges 22 and 23 in spaced apart relationship. The flanges 22 and 23 are positioned in the post 25 by hubs 26 and 27 of the flanges 22 and 23 inserted into the ends of the cylindrical post. The flanges 22 and 23 serve as contact members with their opposed inner surfaces 28 and 29 forming contact surfaces parallel to each other and normal to the post.

An electrode assembly of a first electrode structure 31, specifically a cathode current collector structure, and a second electrode structure 32, specifically an anode electrode structure, are wound around the central post 25 with intervening insulating material 33 separating the electrode structures to maintain them physically separated and electrically insulated from each other. As can best be seen in the perspective view of FIG. 2, the cathode current collector electrode structure 31 includes a substrate 35 of thin, solid metal which is inert to the ingredients of the electrochemical system, for example nickel. The substrate 35 is an elongated member having resilient metal elements or tabs 36 spaced along one edge 37, the lower edge as shown in the figures. Preferably the tabs 36 are slightly curved for purposes to be explained hereinbelow. Insulators 39 are spaced along the opposite edge 38 of the substrate 35. On both sides of the metal substrate 35 are adherent porous layers 40 of a suitable catalytic material for reducing liquid cathode material of the electrochemical system. Various catalyst materials are know, for example porous carbon black.

The anode electrode structure 32 includes a substrate 41 similar to that of the cathode current collector substrate having contact tabs 42 along one edge 43, the upper edge as shown in the figures. The other edge 44 of the substrate has spacers 45 of insulating material positioned therealong. Both sides of the metal substrate 41 are coated with an adherent layer 46 of a suitable oxidizable active anode material, for example lithium metal.

The electrode assembly is wound around the central post 25 of the spool 21 as illustrated by FIG. 2, The deflective contact elements or tabs 36 of the cathode current electrode 31 extend beyond the catalyst material and make physical and electrical contact with the upper surface 29 of the lower flange 23 of the spool. The upper edge 38 of the cathode current collector electrode structure 31 is insulated from contact with the upper flange 22 by the insulating spacers 39. The deflective contact tabs 42 of the substrate 41 of the anode electrode structure 32 make physical and electrical contact with the lower surface 28 of the upper flange 22. The insulating spacers 45 along the lower edge 44 of the substrate 41 prevent the anode electrode structure 32 from being in contact with the lower flange 23. The curved configuration of the contact tabs 36 and 42 facilitates movement of the electrode structures into position toward the center of the spool during winding. The curved resilient contact tabs 36 and 42 bear against the respective contact surfaces 29 and 28 providing good physical and electrical contact therewith and urging the respective insulating spacers 39 and 45 against the opposite contact surface.

As can be seen from the figures, the resulting wound structure includes alternating layers of the anode electrode structure 32 and the cathode current collector electrode structure 31 separated by porous insulating material 33. For an electrochemical system which is lithium limited both the first layer around the post and the outer layer of the electrode assembly are the cathode current collector electrode structure 31.

The battery stack 20 of the electrode assembly wound on the spool 21 is placed within the case 10 of the housing with the lower flange 23 in contact with the case 10 which provides one external terminal of the cell. The lower flange 23 may be welded to the bottom wall 11 of the case 10 to ensure good electrical contact. An insulating spacer 49 is employed to prevent the upper flange 22 from shorting to the case 10, and may also serve to hold the battery stack in position in the housing. An electrical connection 50 between the upper flange 22 and the metal terminal 13 central of the cover 12 provides an external connection for the anode electrode structure 32 of the cell. Prior to sealing, the cell is filled with a suitable electrolytic solution, specifically a solution containing a solvent of a reducible liquid cathode material. As illustrated, the post 25 of the spool 21 may contain openings 51 to facilitate the passage of the solution throughout the battery stack.

For a specific embodiment of an electrochemical cell in accordance with the invention the flanges 22 and 23 may have a diameter of 1.10 inches and the post 25 a diameter of 0.25 inch. The height of the spool 21 is 1.10 inches. The substrates 35 and 41 of the electrode structures 31 and 32 are 0.002 inch thick nickel. The lithium anode material 46 on each side of the anode electrode substrate 41 is 0.005 to 0.010 inch thick, and the porous carbon catalyst material 40 on each side of the cathode current collector electrode substrate 35 is 0.010 to 0.020 inch thick. The insulating material 33 is porous sheets of glass fiber 0.005 to 0.010 inch thick.

Oxidizable materials other than lithium which may be employed in electrochemical cells as described include other alkali metals and also alkaline earth metals. The electrolytic solution comprises a solvent of a reducible liquid cathode material. Among the cathode materials found useful are fluid oxyhalides, fluid non-metallic oxides, fluid non-metallic halides, and mixtures thereof. An electrolyte solute is dissolved in the solvent in order to raise its conductivity. Specifically the solvent may be thionyl chloride and the solute lithium tetrachloroaluminate.

An electrochemical cell as described provides for uniform heat sinking along the entire length of each electrode structure by virtue of the contact tabs of the substrate which bear against the associated conductive flange being distributed along the length of the substrate. This arrangement also provides short, uniform conductive paths for current flow, and thus losses due to internal resistance are the same throughout the battery stack. The distance from the cathode current collector to the active anode material is the same throughout the battery stack. The spool of a central post and two flanges provides support for the electrode assembly at both the top and bottom. In addition the center support for the electrode assembly provides uniform compression of the electrode assembly throughout the assembly during the entire discharge life of the cell.

While there has been shown and described what is considered a preferred embodiment of the present invention, it will be obvious to those skilled in the art that various changes and modifications may be made therein without departing from the invention as defined by the appended claims.

What is claimed is:

1. An electrochemical cell comprising a housing;

a battery stack within said housing including
  a first contact member of conductive material having a contact surface;
  a second contact member of conductive material having a contact surface;
  a post extending between said first and second contact members supporting said contact members in fixed relationship with respect to each other with said first and second contact members electrically insulated from each other;
  a first electrode structure;
  a second electrode structure;
  said first and second electrode structures being wound around said post and being electrically insulated from each other;
  said first electrode structure being in physical and electrical contact with said contact surface of the first contact member and being electrically insulated from the second contact member;
  said second electrode structure being in physical and electrical contact with said contact surface of the second contact member and being electrically insulated from the first contact member;
an electrolyte within said housing in contact with the first and second electrode structures; and first and second terminal means connected to the first and second contact members, respectively.

2. An electrochemical cell in accordance with claim 1 wherein said contact surfaces of said first and second contact members are parallel to each other; and said post extends normal to said contact surfaces of said first and second contact members.

3. An electrochemical cell in accordance with claim 2 wherein said first electrode structure is elongated and has resilient, deflective contact elements along its length at one edge thereof; and said second electrode structure is elongated and has resilient, deflective contact elements along its length at one edge thereof;

the resilient, deflective contact elements along the one edge of said first electrode structure bearing against said contact surface of the first contact member to provide physical and electrical contact therewith; and the resilient, deflective contact elements along the one edge of said second electrode structure bearing against said contact surface of the second contact member to provide physical and electrical contact therewith.

4. An electrochemical cell in accordance with claim 3 wherein said first electrode structure includes an elongated substrate of conductive material supporting a first electrode material on both sides thereof and having resilient, deflective contact elements along its length at one edge thereof;

said second electrode structure includes an elongated substrate of conductive material supporting a second electrode material on both sides thereof and having resilient, deflective contact elements along its length at one edge thereof; and said first and second electrode structures being wound around said post with porous insulating material between the electrode structures to form alternate layers separated by porous insulating material;

the resilient, deflective contact elements along said one edge of the substrate of said first electrode structure bearing against said contact surface of the first contact member to provide physical and electrical contact therewith; and the resilient, deflective contact elements along said one edge of the substrate of said second electrode structure bearing against said contact surface of the second contact member to provide physical and electrical contact therewith.

5. An electrochemical cell comprising a housing of a hollow, cylindrical metal case having an opening at one end thereof and a cover therefor, said cover having a metal electrical terminal extending therethrough into the housing;

an electrochemical system within the housing including an electrolytic solution and a battery stack exposed to the electrolytic solution;

said battery stack including a spool having a first flange of conductive material, a second flange of conductive material, and a central post supporting said first and second flanges in fixed relationship with respect to each other with said first and second flanges electrically insulated from each other;

said first and second flanges having contact surfaces facing each other in spaced apart relationship and parallel to each other;

an electrode assembly of an elongated first electrode structure, an elongated second electrode structure, and porous insulating material separating said first and second electrode structures;

said first electrode structure including an elongated conductive substrate having contact elements along the length thereof at one edge;

said second electrode structure including an elongated conductive substrate having contact elements along the length thereof at one edge;

said electrode assembly being wound around said post with said first and second electrode structures forming alternate layers separated by porous insulating material;

said contact elements of said first electrode structure being in contact with said contact surface of the first flange and said second contact elements of said second electrode structure being in contact with said contact surface of the second flange;

said first flange being electrically connected to said metal electrical terminal and said second flange being electrically connected to said metal case which serves as an external electrical terminal.

6. An electrochemical cell in accordance with claim 5 wherein said contact elements of said substrate of said first electrode structure comprises a plurality of resilient, deflective tabs of substrate material spaced along said one edge thereof and extending beyond the first electrode material;

said contact elements of said substrate of said second electrode structure comprise a plurality of resilient, deflective tabs of substrate material spaced along said one edge thereof and extending beyond the second electrode material;

said resilient, deflective tabs of the substrate material of said first electrode structure bearing against said contact surface of the first flange to make physical and electrical contact therewith; and said resilient, deflective tabs of the substrate material of said second electrode structure bearing against said contact surface of the second flange to make physical and electrical contact therewith.

7. An electrochemical cell in accordance with claim 6 wherein the opposite edge along the length of said substrate of the first electrode structure is protected by insulating material positioned at said opposite edge to prevent electrical contact with said contact surface of the second flange;

said resilient, deflective tabs of substrate material of the first electrode structure bearing against the contact surface of the first flange urging said insulating material against the contact surface of the second flange; and the opposite edge along the length of said substrate of the second electrode structure is protected by insulating material positioned at said opposite edge to prevent electrical contact with said contact surface of the first flange;

said resilient, deflective tabs of substrate material of the first electrode structure bearing against the contact surface of the second flange urging said insulating material against the contact surface of the first flange.

8. An electrochemical cell in accordance with claim 7 wherein
the resilient, deflective tabs of substrate material of the first electrode structure and the resilient, deflective tabs of substrate material of the second electrode structure are each of curved configuration in a direction to facilitate movement of the electrode structures into position toward the center of the spool during winding of the electrode assembly around the post.

9. An electrochemical cell in accordance with claim 8 wherein
said first electrode structure includes a first electrode material on both sides of the substrate; and
said second electrode structure includes a second electrode material on both sides of the substrate.

10. An electrochemical cell in accordance with claim 9 wherein
said electrolytic solution comprises a reducible liquid cathode material;
the electrode material of one of said electrode structures includes an oxidizable active material; and
the electrode material of the other of said electrode structures includes a catalyst material for reducing the liquid cathode material.

11. An electrochemical cell in accordance with claim 10 wherein
the oxidizable active anode material is selected from the group consisting of alkali metals and alkaline earth metals.

12. An electrochemical cell in accordance with claim 11 wherein
the reducible liquid cathode material is selected from the group consisting of fluid oxyhalides, fluid non-metallic oxides, fluid non-metallic halides. and mixtures thereof.

13. An electrochemical cell in accordance with claim 12 wherein
the oxidizable active anode material comprises lithium metal; and
the reducible liquid cathode material comprises thionyl chloride.

* * * * *